US010729070B2

(12) United States Patent
Nyboer

(10) Patent No.: US 10,729,070 B2
(45) Date of Patent: Aug. 4, 2020

(54) MULCHING APPARATUS FOR A LAWNMOWER

(71) Applicant: Paul Howard Nyboer, Hamilton, MI (US)

(72) Inventor: Paul Howard Nyboer, Hamilton, MI (US)

(*) Notice: Subject to any disclaimer, the term of this patent is extended or adjusted under 35 U.S.C. 154(b) by 46 days.

(21) Appl. No.: 15/877,819

(22) Filed: Jan. 23, 2018

(65) Prior Publication Data

US 2018/0206404 A1 Jul. 26, 2018

Related U.S. Application Data

(60) Provisional application No. 62/450,271, filed on Jan. 25, 2017.

(51) Int. Cl.
| | | |
|---|---|---|
| A01D 87/10 | (2006.01) |
| A01D 43/08 | (2006.01) |
| A01D 34/71 | (2006.01) |
| A01D 34/00 | (2006.01) |
| A01D 69/00 | (2006.01) |
| A01D 101/00 | (2006.01) |
| A01D 69/06 | (2006.01) |
| A01D 34/64 | (2006.01) |

(52) U.S. Cl.
CPC ......... *A01D 43/086* (2013.01); *A01D 34/005* (2013.01); *A01D 34/71* (2013.01); *A01D 34/64* (2013.01); *A01D 69/002* (2013.01); *A01D 69/06* (2013.01); *A01D 2101/00* (2013.01)

(58) Field of Classification Search
USPC .................................................. 56/13.3, 202
See application file for complete search history.

(56) References Cited

U.S. PATENT DOCUMENTS

| | | | | |
|---|---|---|---|---|
| 2,105,803 | A | * | 1/1938 | Barnes .................. A01G 20/43 56/501 |
| 2,517,855 | A | | 8/1950 | Elliott et al. |
| 2,538,643 | A | * | 1/1951 | Gregory .................. A01M 5/08 56/13.1 |
| 3,049,857 | A | * | 8/1962 | Shaw ..................... B02C 13/24 56/501 |
| 3,188,787 | A | | 6/1965 | Weiland |
| 3,531,923 | A | | 10/1970 | DeLay |
| 3,664,097 | A | | 5/1972 | Pedigo |
| 3,688,479 | A | * | 9/1972 | Milton .................. A01D 51/00 56/13.2 |
| 3,706,189 | A | * | 12/1972 | Rutherford .......... A01D 34/005 56/13.4 |
| 3,846,963 | A | | 11/1974 | Pedigo |
| 3,925,968 | A | | 12/1975 | Wagenhals |

(Continued)

*Primary Examiner* — Thomas B Will
*Assistant Examiner* — Mai T Nguyen
(74) *Attorney, Agent, or Firm* — Warner Norcross + Judd LLP

(57) ABSTRACT

A mulching apparatus for attachment to a lawnmower includes a cutting assembly separate from the mower blades, wherein the grass clippings are finely cut and then dispersed onto the ground surface. A spreader assembly receives the mulched grass clippings from the cutting assembly and disperses the mulched grass clippings onto a ground surface. Optionally, the mulching apparatus includes a feeder assembly to facilitate supplying grass clippings to the cutting assembly.

8 Claims, 8 Drawing Sheets

(56) References Cited

U.S. PATENT DOCUMENTS

| | | | | |
|---|---|---|---|---|
| 4,043,100 A * | 8/1977 | Aumann | A01D 43/077 | |
| | | | 56/16.5 | |
| 4,114,353 A | 9/1978 | Ansbaugh | | |
| 4,199,926 A | 4/1980 | Petty | | |
| 4,263,771 A | 4/1981 | Iaboni | | |
| 4,379,385 A | 4/1983 | Reinhall | | |
| 4,426,830 A * | 1/1984 | Tackett | A01D 43/077 | |
| | | | 56/16.6 | |
| 4,550,554 A * | 11/1985 | Lundahl | A01D 34/412 | |
| | | | 56/294 | |
| 4,558,559 A * | 12/1985 | Klever | A01C 21/00 | |
| | | | 56/16.4 D | |
| 4,741,148 A | 5/1988 | Ekas, Sr. et al. | | |
| 4,819,417 A * | 4/1989 | Bryant | A01D 43/077 | |
| | | | 56/16.6 | |
| 4,986,063 A * | 1/1991 | Eggenmuller | A01D 43/0633 | |
| | | | 56/16.6 | |
| 5,005,342 A * | 4/1991 | Lundahl | A01D 34/53 | |
| | | | 56/10.2 R | |
| 5,020,309 A | 6/1991 | Hopkins | | |
| 5,070,683 A | 12/1991 | Eggenmueller | | |
| 5,129,217 A | 7/1992 | Loehr | | |
| 5,189,868 A | 3/1993 | Hill | | |
| 5,191,756 A | 3/1993 | Kuhn | | |
| 5,199,251 A | 4/1993 | Rouse et al. | | |
| 5,240,188 A | 8/1993 | Whitmire | | |
| 5,428,864 A | 7/1995 | Pemberton | | |
| 5,485,715 A | 1/1996 | Breeden | | |
| 5,491,964 A | 2/1996 | Butler | | |
| 5,613,353 A | 3/1997 | Kugler | | |
| 5,626,008 A | 5/1997 | Puszkar | | |
| 5,960,619 A | 10/1999 | Seidel et al. | | |
| 5,987,863 A | 11/1999 | Busboom et al. | | |
| 6,016,644 A | 1/2000 | Specht | | |
| 6,065,276 A | 5/2000 | Hohnl et al. | | |
| 6,089,006 A | 7/2000 | Langford | | |
| 6,644,003 B1 | 11/2003 | Bass | | |
| 6,658,833 B2 * | 12/2003 | Dunning | A47L 9/1608 | |
| | | | 56/202 | |
| 6,826,896 B1 | 12/2004 | Liao | | |
| 7,065,946 B2 | 6/2006 | Boeck et al. | | |
| 7,837,751 B2 | 11/2010 | Dunning | | |
| 8,122,697 B1 | 2/2012 | Clemens | | |
| 9,560,798 B2 | 2/2017 | Nyboer et al. | | |

* cited by examiner

MULCHING APPARATUS FOR A LAWNMOWER

BACKGROUND OF THE INVENTION

The present invention relates to lawnmowers, and more particularly to a mulching apparatus that can be attached to a lawnmower for cutting (i.e., "mulching") the grass clippings in a manner that they can be deposited onto the ground surface.

As is generally known, lawnmowers include a mower deck that houses one or more rotating blades for cutting grass. The loose pieces of grass that have been cut by the lawnmower blades are often referred to as grass clippings.

Difficulties often arise with the disposal of grass clippings. Depositing or blowing grass clippings directly onto the ground surface can be unsightly, especially when the grass clippings are wet or particularly long, because they may clump and/or rest on top of the grass. As a result, commercial and residential lawn mowers alike generally use one of two recognized methods for disposing of grass clippings, which include: (1) collecting the grass clippings in one or more bags or other containers, or (2) re-cutting or "mulching" the grass clippings into smaller pieces that can be deposited onto the ground surface in a manner that is less visible than directly dropping the grass clippings.

Unfortunately, both of these known methods can be problematic. Collecting the grass clippings is generally done with a bagging attachment that includes a chute connected between the mower deck and one or more containers. The bagging attachment utilizes the forced air produced by the spinning mower blades, and/or an additional blower, to blow the grass clippings through the chute and into the one or more containers. Even when these bagging attachments work correctly, they are troublesome in that they require additional time for the operator to interrupt the mowing process and empty the containers, and they require a separate location for dumping the collected clippings. And in many cases, these bagging attachments fail due to the clippings clogging in the mower deck, chute or containers.

Mulching can also be problematic. Most mulching mowers re-cut the grass clippings within the mower deck by containing the grass clippings within the mower deck and using a combination of special blades and forced air to cut and re-cut the grass clippings within the mower deck. The re-cut (i.e., "mulched") grass clippings eventually drop onto the ground surface in a smaller, and thus less unsightly, form. Unfortunately, these mulching arrangements generally only work under ideal conditions where the grass is dry and not too long. Wet grass, or particularly long grass, often clogs within the mower deck, is not re-cut as desired, and falls onto the ground surface in unwanted clumps.

SUMMARY OF THE INVENTION

The present invention provides a mulching apparatus for attachment to a lawnmower. The mulching apparatus includes a cutting assembly separate from the mower blades of the lawnmower, wherein the grass clippings, leaves, thatch and other yard waste can be consistently finely cut and then dispersed onto the ground surface.

In one embodiment, a mulching apparatus is provided for attachment to a lawnmower having a mower deck and at least one lawnmower blade within the mower deck. The mulching apparatus includes a chute adapted to be attached to the lawnmower for receiving grass clippings from the lawnmower. A cutting assembly is connected to the chute and receives grass clippings from the chute. The cutting assembly includes at least one cutting blade configured to cut the grass clippings received from the lawnmower to form mulched grass clippings. The mulched grass clippings exit the cutting assembly through an outlet. A spreader assembly includes an inlet for receiving the mulched grass clippings from the cutting assembly outlet and is configured to disperse the mulched grass clippings onto a ground surface.

In another embodiment, the spreader assembly further includes a blower fan configured to draw the mulched grass clippings exiting the cutting assembly outlet into the spreader assembly. The blower fan can be powered by one of a motor and a supply of forced air.

In yet another embodiment, the spreader assembly further includes a dispersion fan having a plurality of rotatable blades configured to disperse the mulched grass clippings onto the ground surface. At least a portion of the rotatable blades include at least one projection along a length of the rotatable blade. The dispersion fan can be powered by one of a motor and a supply of forced air. Optionally, the mulching apparatus includes a source of forced air and a chute for supplying the forced air onto the dispersion fan.

According to another embodiment, a mulching apparatus is provided for attachment to a lawnmower having a mower deck and at least one lawnmower blade within the mower deck. The mulching apparatus includes a chute adapted to be attached to the lawnmower for receiving grass clippings from the lawnmower. A cutting assembly is connected to the chute and includes at least one cutting blade configured to cut the compressed grass clippings to form mulched grass clippings. The mulching apparatus also includes an auger rotatable about a central axis and configured to drive the grass clippings toward the cutting blade. A feeder assembly is disposed adjacent to and offset from the central axis of the auger and is configured to agitate grass clippings between the feeder assembly and the auger.

In another embodiment, the feeder assembly includes a feeder head moveable along a vertical axis orthogonal to the central axis of the auger. The feeder head can include at least one of a plurality of bristles, a plurality of teeth, a plurality of nubs, and combinations thereof.

In another embodiment, the feeder assembly of claim 8 includes a roller rotating about a central axis that is parallel to and offset from the central axis of the auger. The roller can include at least one of a plurality of bristles, a plurality of teeth, a plurality of nubs, and combinations thereof.

In another embodiment, the auger includes an auger blade and a plurality of teeth projecting from the auger blade.

In still another embodiment, a method for mulching grass clippings includes providing a cutting assembly for attaching to a lawnmower having a mower deck containing at least one mower blade. The mower blade can be operable to rotate to thereby cut grass into grass clippings. The lawnmower can also produce a supply of forced air. The cutting assembly includes a cutting blade separate from the mower blade. The method also includes transporting the grass clippings from the mower blade to the cutting assembly and cutting the grass clippings in the cutting assembly with the cutting blade to form mulched grass clippings. The mulched grass clippings are transported to a spreader assembly that includes a blower configured to draw the mulched grass clippings through the spreader assembly. The mulched grass clippings are then dispersed onto the ground surface.

In another embodiment, the method further includes supplying the mulched grass clippings onto a dispersion fan. The method can optionally include supplying forced air onto the dispersion fan.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION

I. Overview

Figure 1:
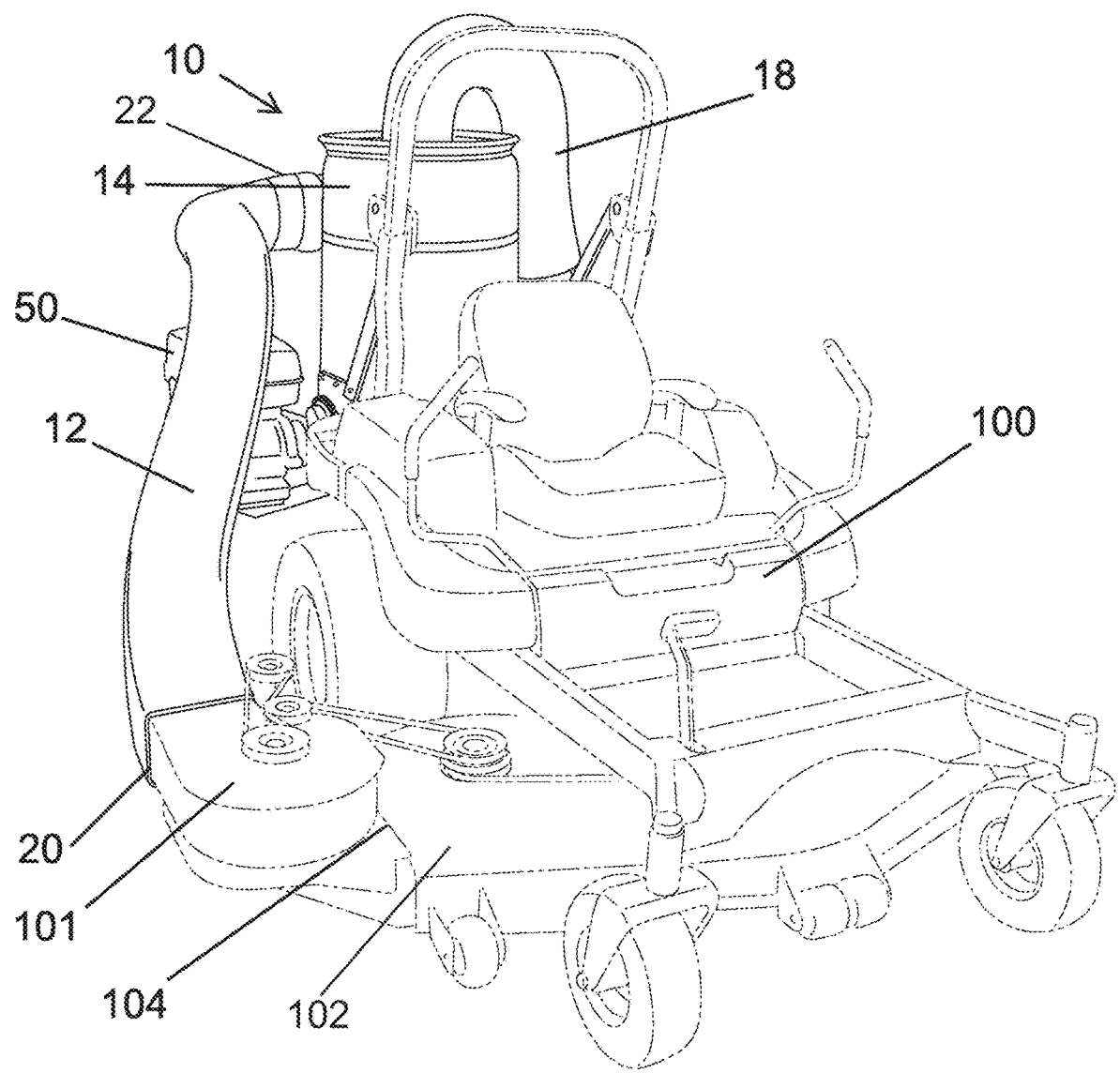
FIG. 1 is a perspective view of a mulching apparatus attached to a lawnmower according to one embodiment of the present invention.

A mulching apparatus for a lawnmower according to one embodiment of the present invention is shown in FIGS. 1-10 and generally designated 10. In the illustrated embodiment, the mulching apparatus 10 is attached to a lawnmower 100 (shown in broken lines), such that grass clippings, leaves, thatch and other yard waste exiting the lawnmower 100 are directed into the mulching apparatus 10, cut into smaller pieces, and then outputted onto the ground surface. The mulching apparatus 10 generally includes an transportation chute 12, a separation chamber 14, a cutting assembly 16 and a dispersion assembly 18. Many of the elements of the mulching apparatus 10 are similar to those described in U.S. Patent Pub. No. 2015/0143790 entitled "Mulching Apparatus for a Lawnmower," filed Nov. 22, 2013, which is incorporated herein by reference in its entirety. Only those elements necessary for a complete understanding of the embodiments of the present invention are described in detail herein.

Figure 2:
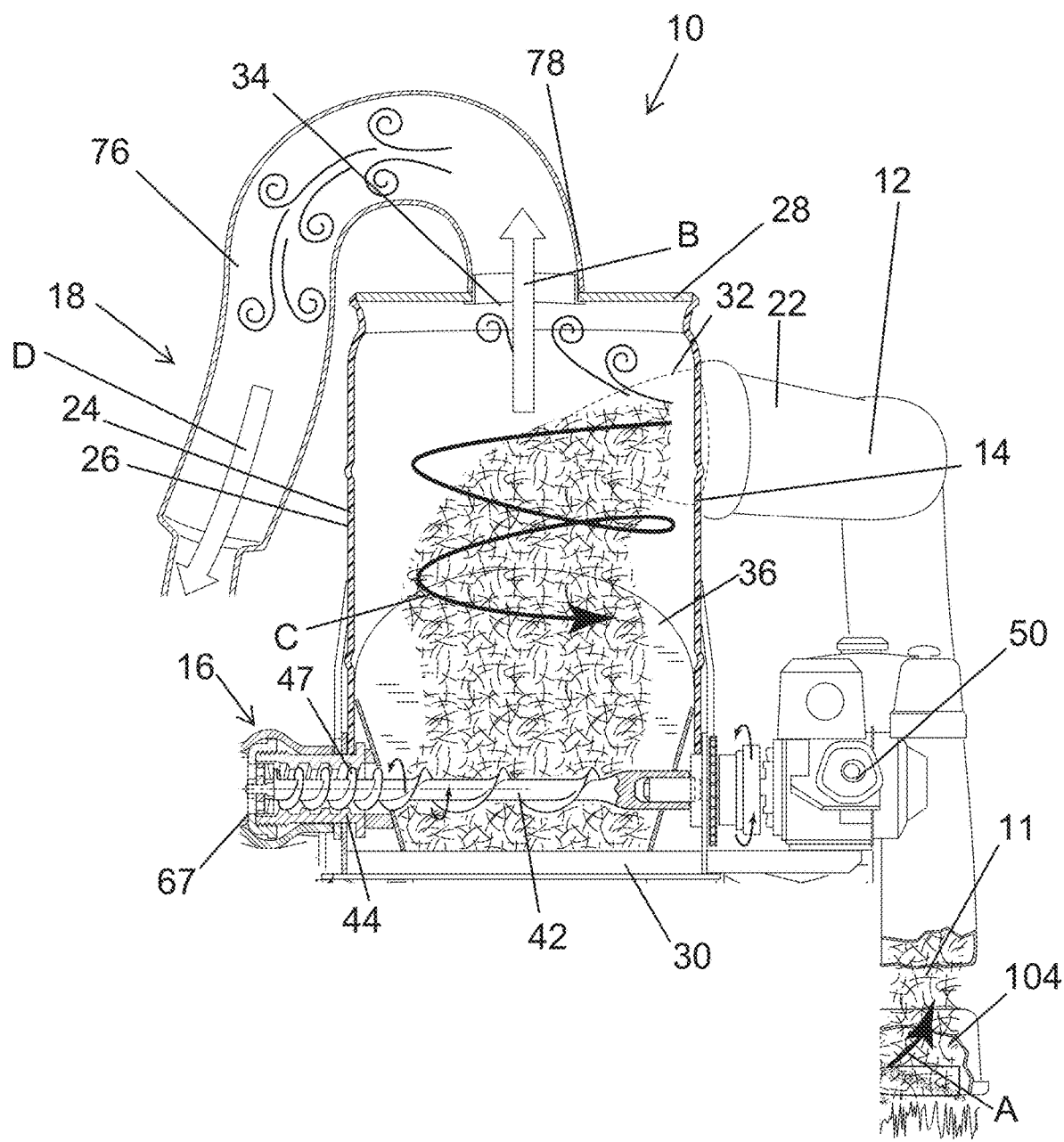
FIG. 2 is a rear view thereof with portions of the mulching apparatus shown in section to illustrate the grass clippings flow path.

Referring now to FIGS. 1 and 2, grass clippings exiting the lawnmower 100 may be routed into the chute 12 and then into the separation chamber 14, wherein the clippings are further routed into the cutting assembly 16 and then re-cut in a cutting operation separate from the lawnmower blade cutting operation. The re-cut grass clippings exit the cutting assembly 16 and are dispersed onto the ground surface. Throughout this description, directional terms, such as "vertical," "horizontal," "top," "bottom," "upper," "lower," "inner," "inwardly," "outer" and "outwardly," may be used to assist in describing the invention based on the orientation of the embodiments shown in the illustrations. The use of directional terms should not be interpreted to limit the invention to any specific orientation(s).

II. Structure

A mulching apparatus according to the present invention may be designed to attach to a variety of types of conventional lawnmowers including, but not limited to, commercial lawnmowers, residential riding lawnmowers and lawn tractors, and walk-behind lawnmowers. Still referring to FIGS. 1 and 2, the mulching apparatus 10 is shown in connection with a conventional commercial riding lawnmower 100. Because it is conventional, the lawnmower will not be described in detail. Suffice it to say that in general, lawnmowers include a mower deck 102 mounted to the lawnmower 100. The mower deck 102 houses one or more rotating blades that can be actuated to cut grass as the lawnmower moves over the ground surface. The cut grass is generally referred to in this application as "grass clippings" which are generally designated 11 in FIG. 2. Many lawnmowers include a port 104 on the mower deck 102—often an opening on the side of the mower deck 102—that can be opened to allow the grass clippings to exit the mower deck 102.

In the illustrated embodiment, the lawnmower 100 further includes a blower 101 connected to the mower deck 102 at the port 104 to supplement the forced air of the mower blades, such that the rotating blade(s) and/or the blower 101 form a forced air system. The force of the rotating blade or blades and/or the blower 101 acts to blow the grass clippings out of the port 104. This forced air exiting the mower deck 102 is represented by arrow A in FIG. 2. Although the size, shape and structure of various types of lawnmowers may be different, each lawnmower generally includes a structural location where a mulching apparatus such as the current invention can be mounted or attached. It should be appreciated that the size, shape and arrangement of the mulching apparatus components may be altered to accommodate the size, shape and power of the particular type of lawnmower to which it is attached. For example, the components of a mulching assembly 10 for attachment to residential riding lawnmower or walk-behind lawnmower—although consistent in structure and function to those of the illustrated embodiment—may be smaller and more compact than those shown in the illustrated embodiment in connection with a commercial lawnmower 100.

The transportation chute 12 routes grass clippings 11 exiting the mower deck 102 and/or blower 101 into the mulching apparatus 10. Thus, instead of directly disposing the grass clippings onto the ground surface or into a bagging apparatus, the chute 12 causes grass clippings to flow into the separate mulching apparatus 10 attached to the lawnmower 100. The chute 12 may take a variety of shapes and forms, depending on the type of mower to which it is attached. In one embodiment, the chute 12 may be the same as or similar to a chute designed for use with a conventional bagging apparatus. In general, the chute 12 extends between the mower deck 102 and/or blower 101 and the separation chamber 14. In the illustrated embodiment, the chute 12 is elongated and includes a first end 20 attached to the blower 101 and a second end 22 attached to the separation chamber 14 (which is described in more detail below). In an embodiment with no blower 101, the first end 20 may attach directly to the exit port 104 of the mower deck 102. In one embodiment, the chute 12 may utilize the forced air A created by the mower blades and/or blower 101 to force the grass clippings 11 through the chute 12 from the first end 20 to the second end 22. In one embodiment, a chute 12 may not be necessary, as the separation chamber 14 and/or cutting assembly 16 may be directly connected to the mower deck 102.

The separation chamber 14 directs grass clippings into the cutting assembly 16, and also directs the forced air from the chute into the dispersion assembly 18. The forced air exiting the separation chamber 14 is designated at arrow B and described in more detail below. Thus, the grass clippings 11 are separated from the forced air such that the cutting assembly 16 can re-cut the grass clippings 11 in an operation separate from the forced air, and the forced air B can be routed to disperse the re-cut grass. Put another way, the grass clippings 11 and forced air A are combined when entering the separation chamber 14, then separated from one another during the cutting operation, and then re-introduced to one another after the cutting operation to disperse the re-cut grass 15 onto the ground surface.

Referring now to FIG. 2, in the illustrated embodiment, the separation chamber 14 is formed by a cylindrical container 24 having a sidewall 26, an upper end 28 and a bottom 30. In one embodiment, the second end 22 of the chute 12 is connected to the container 24 at an input opening 32 in the sidewall 26. Optionally, the opening 32 may be radially offset so that the forced air and grass clippings entering the separation chamber 14 are caused to flow in a vortex pattern (designated by arrow C) around the inside of the sidewall 26 as they fall toward the bottom 30. The flow of the grass clippings 11 and air in this vortex pattern C may prevent the clippings from piling up at one location on the bottom of the chamber 14 by dispersing the grass clippings across the diameter of the chamber 14 as they flow through the chamber 14.

The upper end 28 of the separation chamber 14 may define a forced air exit opening 34 that enables the forced air B to exit the chamber 14. As shown in FIG. 2, the forced air generally follows the vortex pattern C as it enters the chamber 14, and then flows upwardly through the center of the chamber approximately along a centerline of the chamber 14 and out through the exit opening 34 in the direction of arrow B.

The lower portion of the container 24, adjacent the bottom 30, can be configured to include the cutting assembly 16. In the illustrated embodiment, the interior of the sidewall 26 optionally includes a pair of panels 36 that converge toward each other approaching the container bottom 30 on either side of the cutting assembly 16. The panels 36 can facilitate funneling the falling grass clippings toward the center of the container 24. A grass clippings exit opening is formed between the lower edges of the panels 36. Although the separation chamber 14 is illustrated as a cylindrical container with an input opening creating a vortex, other methods of directing the grass clippings into the cutting assembly 16 may also be used.

Figure 3:
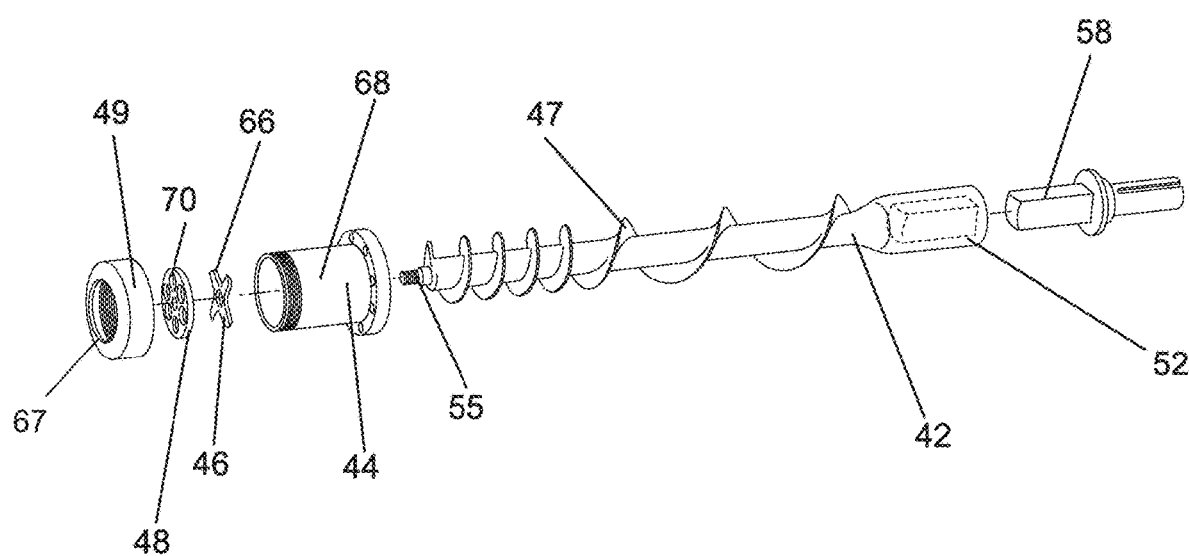
FIG. 3 is a close up exploded view of a cutting assembly according to one embodiment of the present invention.

Referring now to FIGS. 2 and 3, the cutting assembly 16 provides a system for re-cutting the grass clippings in an operation separate from the initial cut by the mower blades within the mower deck 102. In one embodiment, the cutting assembly 16 is designed to cut the grass clippings by compressing the clippings into a compression cutting chamber 44 and forcing them through at least one cutting blade. In the illustrated embodiment, the cutting assembly 16—or at least a portion thereof—is positioned below or adjacent the grass clippings exit opening of the panels 36, and includes an auger 42, a cutting chamber 44, a blade 46, a stationary plate 48 and a cap 49. The auger 42 is driven to rotate about a central axis.

Figure 4:
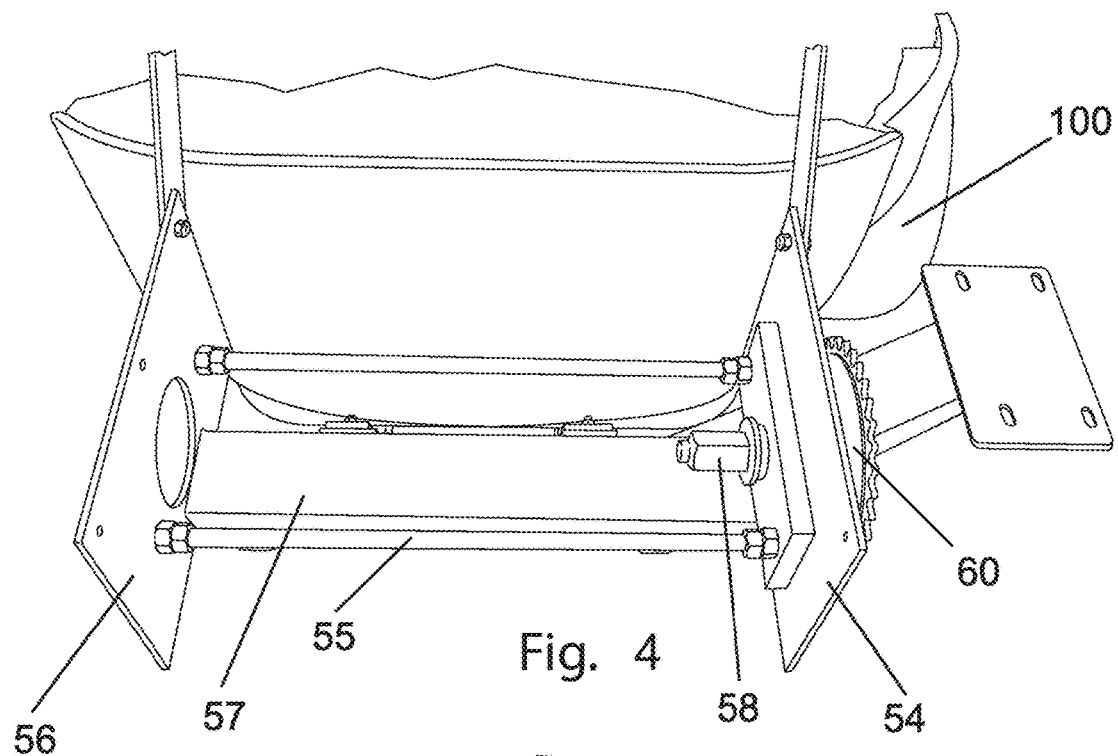
FIG. 4 is a partially assembled view of a portion of the mulching apparatus according to one embodiment.
Figure 5:
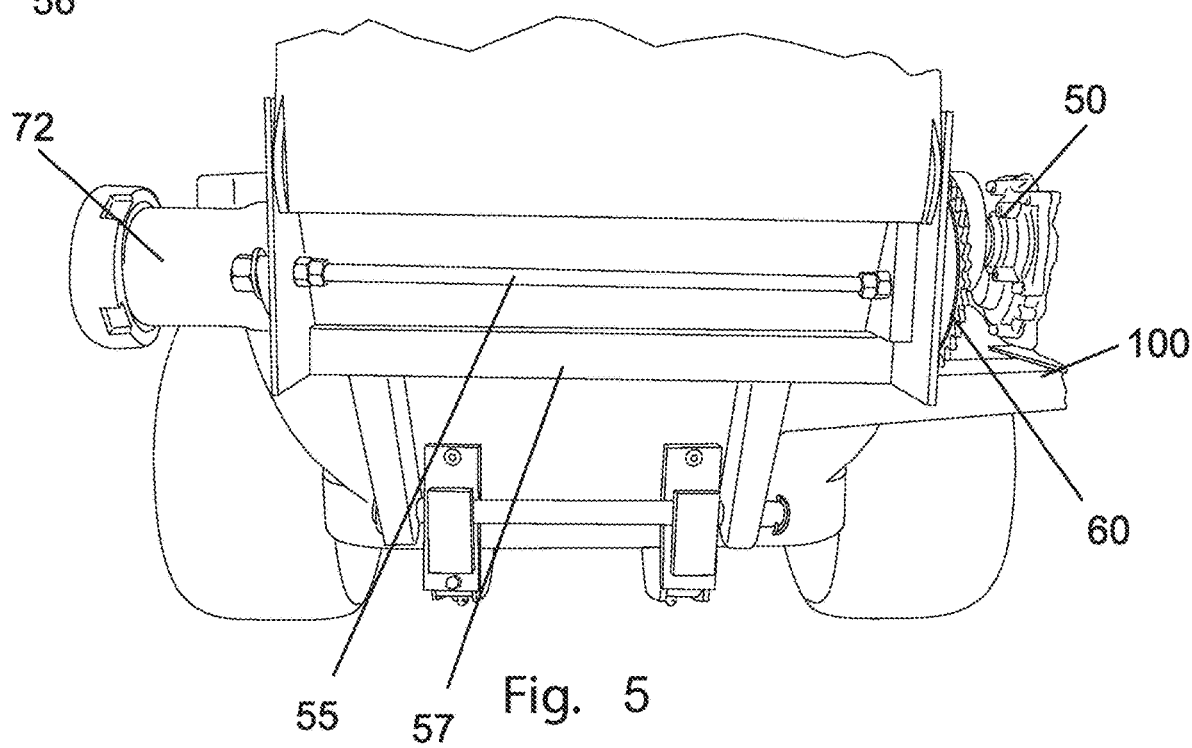
FIG. 5 is another partially assembled view of a portion of the mulching apparatus according to one embodiment.

Referring now to FIGS. 4 and 5, in the illustrated embodiment, the auger 42 includes a first end 52 supported by a first support plate 54 and a second end 55 extending through a second support plate 56. A pair of support rods 55 and a mounting bracket 57 holds the cutting assembly 16 in place. As shown, the first end 52 of the auger 42 includes a drive shaft 58. A drive gear 60 is mounted on the drive shaft 58 such that the drive gear 60 rotates with the drive shaft 58 about the central axis. The drive gear 60 can be connected to a motor gear 62 with a drive belt or chain 64. The motor gear 62 is connected to a secondary motor 50, which may be a conventional gasoline motor mounted onto the lawnmower 100 in a conventional manner. Operation of the secondary motor 50 causes the auger 42 to rotate about the central axis. The auger 42 may be driven by a variety of conventional methods. Although the mulching apparatus 10 includes a secondary motor 50 powered separately from the lawnmower 100, it is quite possible that in other embodiments the auger 42 may be driven directly by the primary motor of the lawnmower 100, for instance, by an auxiliary drive shaft extending from the primary motor.

Referring again to FIGS. 2 and 3, the second end 55 of the auger extends into the cutting chamber 44, which in the illustrated embodiment is formed by a cylindrical pipe 68 mounted to the second support plate 56 and partially closed with the cap 49 to form a mulching exit opening 67 in the separation chamber 14. The blade 46 may be mounted on the second end 55 of the auger 42 within the cutting chamber 44 such that the blade 46 rotates with the auger 42. In the illustrated embodiment, the blade 46 includes four spaced apart knife blades 66 extending outwardly from the central axis, although a variety of blade arrangements may be used. In addition, the stationary plate 48 is mounted on the second end 55 of the auger 42 within the cutting chamber 44. As shown, the stationary plate 48 includes a series of spaced apart holes 70 extending through the stationary plate 48. The shape, size, and spacing of the holes 70 may be configured to maximize the flow rate of the re-cut grass clippings 15 through the stationary plate 48. In the illustrated embodiment, the plate 48 defines six circular holes of equal diameter spaced evenly apart about the plate 48. Alternatively, the holes 70 may vary in size and may have an oval, triangular, rectangular, square, or other desired shape. The stationary plate 48 may be mounted such that it remains stationary with respect to the blade 46 and auger 42.

Figure 6:
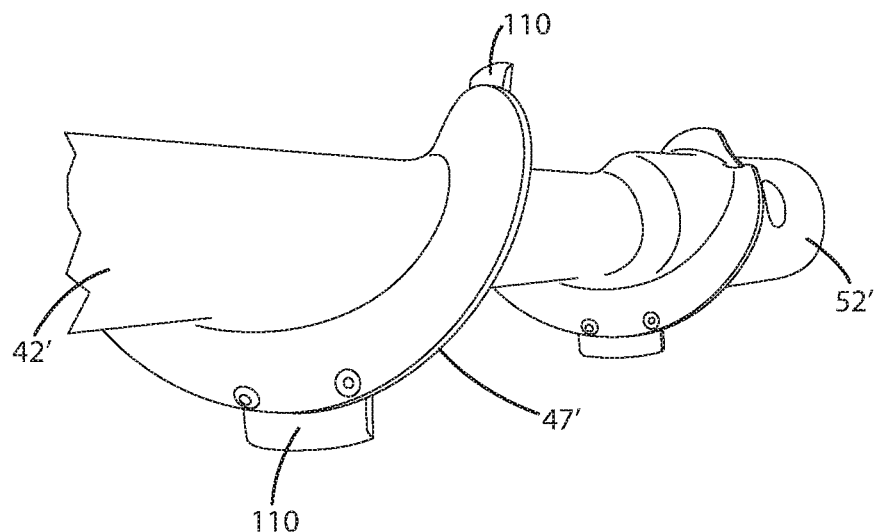
FIG. 6 is a perspective view of an auger according to one embodiment of the invention.

An alternative auger 42' is illustrated in FIG. 6 and may be mounted within the separation chamber 14 in the same manner as described above for the auger 42. The auger 42' is similar to the auger 42 of FIG. 3 except that a plurality of teeth 110 are provided along the auger blade 47'. The teeth 110 project outward away from the central axis of the auger 42' a predetermined distance. The dimensions and spacing of the teeth 110 can be selected based on the desired performance of the auger 42'. The teeth 110 can be made from the same material as the auger blade 47' or a different material. In one example, the teeth 110 are attached to the auger blade 47', as illustrated. The teeth 110 can be attached using any suitable mechanical or non-mechanical fastener, non-limiting examples of which include bolts, screws, clamps, snap-fit connection, tongue-groove connection, welds, adhesives, and combinations thereof. In another example, the teeth 110 are integrally formed with the auger blade 47' in a casting or molding process.

Figure 7:
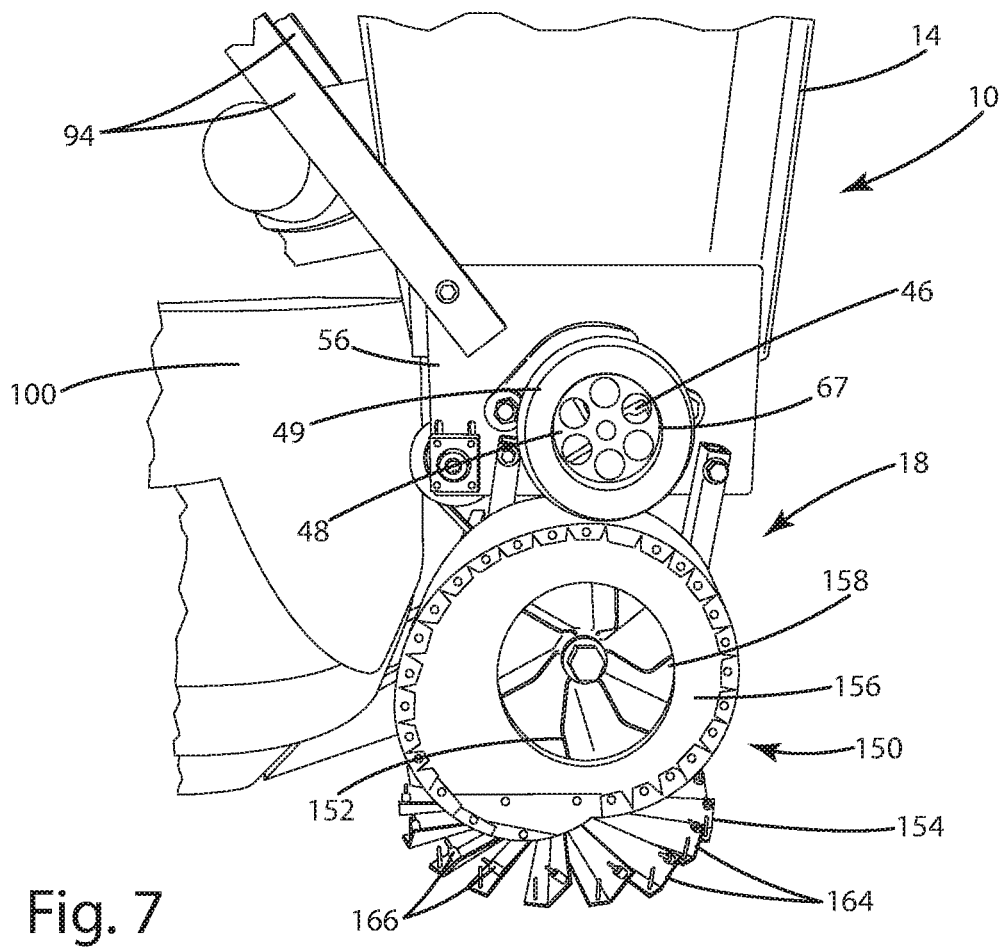
FIG. 7 is a side view of a partially assembled mulching apparatus according to one embodiment.
Figure 8:
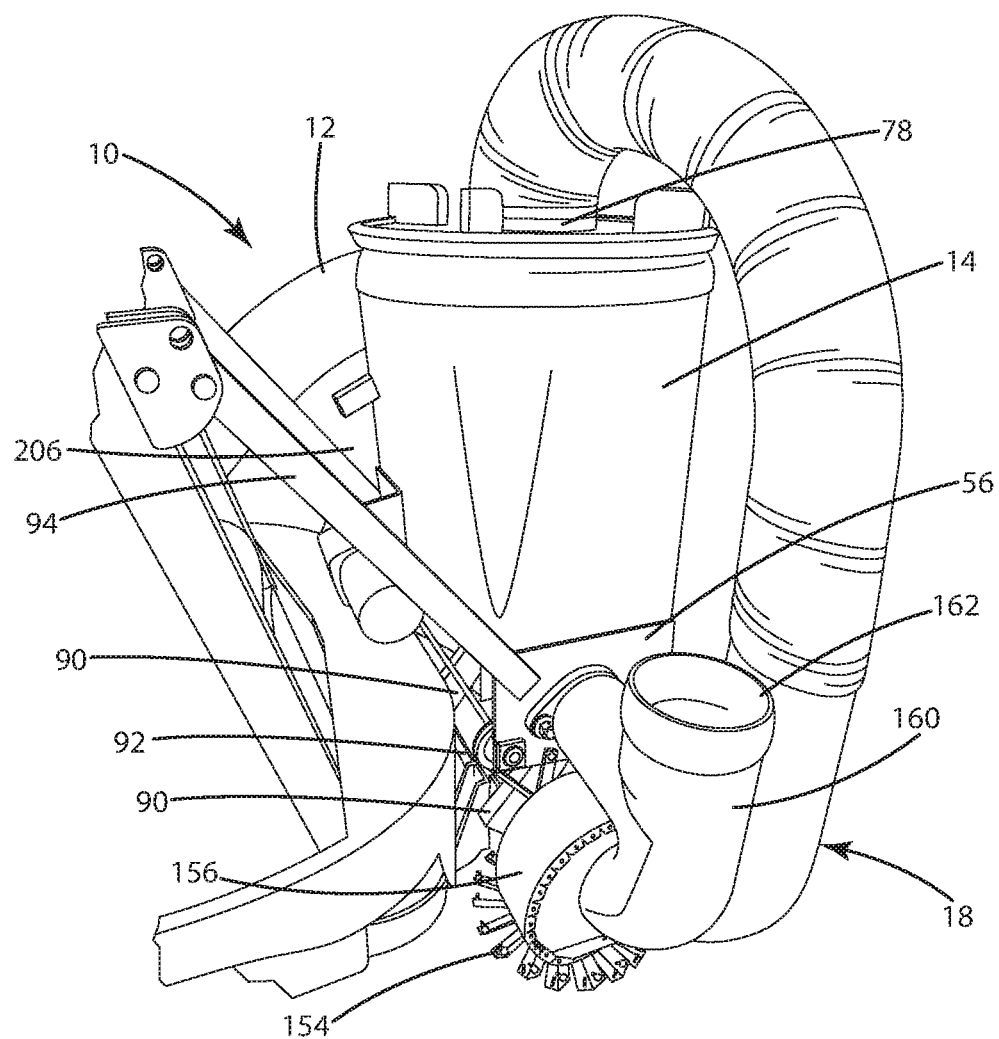
FIG. 8 is a perspective view of a portion of a mulching apparatus according to one embodiment.
Figure 9:
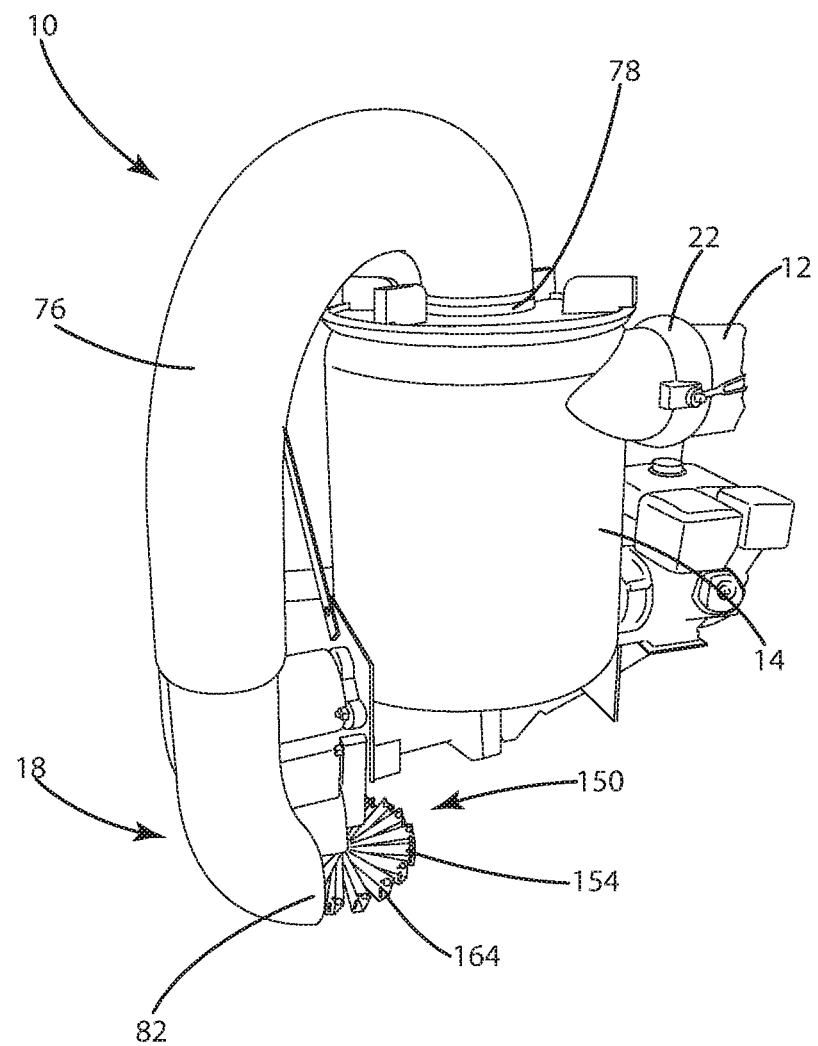
FIG. 9 is a rear perspective view of a mulching apparatus according to one embodiment.

Referring now to FIGS. 7-9, the dispersion assembly 18 operates to spread the re-cut grass clippings as a mulch onto the ground surface. The dispersion assembly 18 includes a spreader assembly 150 that receives the re-cut grass clippings exiting the cutting assembly 16. With reference to FIG. 7, the spreader assembly 150 includes a blower fan 152 that draws the re-cut grass clippings exiting the cutting assembly 16 toward a dispersion fan 154 for spreading the re-cut grass clippings as a mulch onto the ground surface. The blower fan 152 is located within a housing 156 positioned adjacent the cutting assembly exit opening 67 and can be motor driven and/or driven using forced air created by the mower blades and/or the blower 101. In one example, the blower fan 152 is connected with the secondary motor 50 or some other motor through a suitable drive assembly. The exit opening 67 is connected with an inlet opening 158 of the spreader assembly 150 by a connector 160 (FIGS. 8 and 9). The connector 160 can include a vent 162 to allow air to be drawn into the spreader assembly 150 during operation of the blower fan 152.

Still referring to FIGS. 7-9, the dispersion fan 154 can include a plurality of rotatable blades 164 which optionally include one or more protrusions 166 adjacent the distal ends of the blades 164 to facilitate dispersing the re-cut grass clippings. The dispersion fan 154 can be motor driven and/or driven using forced air created by the mower blades and/or the blower 101. In one example, the dispersion fan 154 is connected with the secondary motor 50 or some other motor through a suitable drive assembly. In another example, the forced air exiting the separation chamber 14 is blown onto the dispersion fan 154 to facilitate spreading the re-cut grass clippings.

With reference again to FIGS. 2 and 9, the dispersion assembly 18 includes a dispersion chute or tube 76 having a first end 78 extending outwardly from the forced air exit opening 34 at the upper end 28 of the separation chamber 14, such that the forced air represented by arrow B exiting the separation chamber 14 flows through the dispersion chute 76. As shown in FIG. 9, the dispersion chute 76 includes an outlet 82 positioned adjacent the dispersion fan 154 such that the forced air flowing through the dispersion chute 76 (represented by arrow D in FIG. 2) is blown onto the blades 164 of the dispersion fan 154. Dispersion chute 76 is illustrated as a multi-piece tube 76, however, in another embodiment the dispersion chute may be formed as a single piece.

Figure 10:
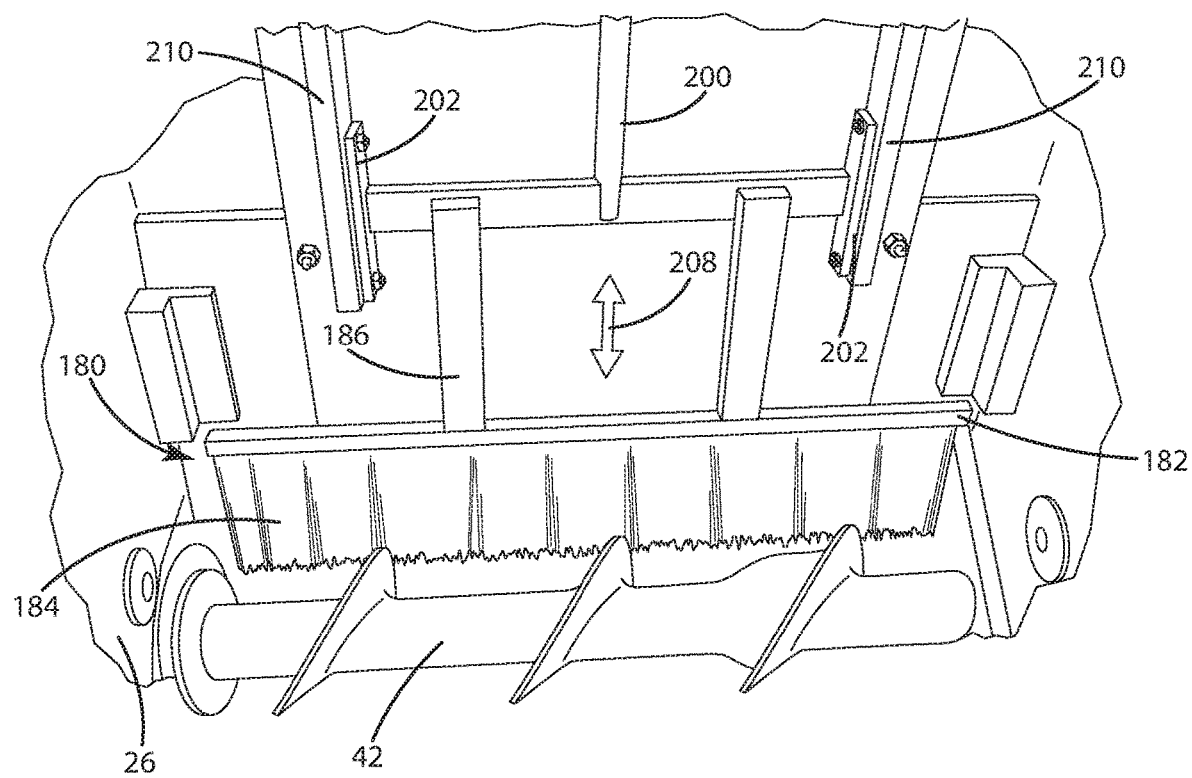
FIG. 10 is perspective view of a mulching apparatus having feeder assembly according to one embodiment.

Referring now to FIG. 10, the mulching apparatus 10 optionally includes a feeder element 180. The feeder element 180 can be positioned adjacent the auger 42, between the sidewall 26 and the plates 36 (FIG. 2), and spaced, i.e. offset, from the central axis of the auger 42. The feeder element 180 can be configured to move relative to the auger 42 to disturb or break up material that may accumulate around the auger 42, potentially clogging the cutting assembly 16 and/or decreasing the efficiency of the cutting assembly 16. In the embodiment illustrated in FIG. 10, the feeder element 180 includes a feeder head 182 having a plurality of bristles 184, a support structure 186, an actuator arm 200, and an optional pair of guide arms 202. The actuator arm 200 is operably connected to a drive shaft 206 (FIG. 8) which is operably connected to the secondary motor 50 by an appropriate drive assembly (not shown). Alternatively, the drive shaft 206 is driven by a separate motor. Movement of the drive shaft 206 causes the actuator arm 200 to move the feeder head 182 vertically relative to the auger 42, i.e. moveable along a vertical axis orthogonal to the central axis of the auger 42, as indicated by arrow 208. As the feeder head 182 moves, the guide arms 202 travel within an optional corresponding pair of channels 210 provided within the separation chamber 14, which stabilizes the vertical movement of the feeder head 182.

While the feeder element 180 is illustrated as having a plurality of bristles 184, the feeder element 180 may include additional or alternative elements for breaking up material accumulating around the auger 42 and/or feeding material to the auger 42, non-limiting examples of which include a plurality of teeth, nubs, brush tufts, etc. Alternatively, rather than a vertically moving feeder head 182, the feeder element 180 may be in the form of a roller rotating along an axis parallel to, but offset from the central axis of the auger 42. The roller can include any combination of projections or other elements, non-limiting examples of which include bristles, teeth, nubs, brush tufts, etc. to facilitate breaking up material accumulating around the auger 42 and/or feeding material to the auger 42.

Referring again to FIGS. 7 and 8, one example of the attachment of the mulching apparatus 10 to the lawnmower 100 is illustrated includes a pair of lower arms 90 connected by a cross-member 92 and a pair of upper arms 94. The arms 90, 94 are connected by conventional means to attachment structure on the lawnmower 100. Many other types of attachment systems may be used, depending on the arrangement of the mulching apparatus and the configuration of the lawnmower.

III. Operation

Operation of the mulching apparatus 10 generally includes the steps of: (a) transporting grass clippings 11 from the lawnmower deck 102, (b) separating the grass clippings from the forced air created by the mower blades and/or blower 101, (c) cutting the grass clippings with a blade separate from the mower blades, and (d) dispersing the re-cut grass 15 (i.e., mulch) onto the ground surface.

In a more particular embodiment, the step of transporting the grass clippings may include providing the chute 12 connected between the mower deck 102 and/or blower 101 and the separation chamber 14. The grass clippings 11 may be transported through the chute via the forced air exiting the mower deck 102 and/or blower 101 (represented by arrow A). The step of separating the grass clippings 11 from the forced air may be accomplished by a variety of methods, including blowing the grass clippings into the chamber 14 and letting the clippings fall into the cutting assembly 16. In the illustrated embodiment, the grass clippings 11 are blown into the cylindrical separation chamber 14, and enter the chamber 14 near the sidewall 26 of the chamber 14 such that the clippings 11 and the forced air flow into the chamber together in a vortex pattern (represented by arrow C). The flow of the vortex pattern spreads the grass clippings out across the diameter of the chamber 14 as they fall into the cutting assembly 16 adjacent the bottom 30 of the chamber 14. The converging panels 36 at the bottom 30 of the chamber 14 act to funnel the falling grass clippings to the auger 42 of the cutting assembly 16.

The cutting assembly 16 operates to re-cut the grass clippings into small pieces such that they form a mulch that can be dropped onto the ground surface generally without forming visible clumps or pieces of grass on the ground surface. In one embodiment, the cutting assembly 16 re-cuts or "mulches" the grass clippings in an environment separate from the forced air (for example, as a result of the separation chamber 14). This isolated cutting operation may enable a more controlled and finer cut of the grass clippings. Referring to FIGS. 2-3, the grass clippings 11 fall into the rotating auger 42 and the auger 42 forces the grass clippings into the cutting chamber 44. More particularly, the auger blades 47 near the cutting chamber 44 are spaced closer to one another, such that the grass clippings become compressed between the auger blades 47 and the wall of the cutting chamber 44 which includes at least one helical groove 45 formed therein that is configured to receive the auger blades 47. The compressed grass clippings are then forced through the blades 66 of the knife 46 and the plate 48 and cut into fine pieces that pass through the holes 70 in the plate 48. In one embodiment, the clippings are mulched into pieces that are between about 0.125" and 0.3125" long.

With reference to FIGS. 7-8, the re-cut grass clippings exit the cutting assembly 16 via the exit opening 67 and travel through the connector 160 of the spreader assembly 150, through the inlet opening 158, and into the housing 156. Rotation of the blower fan 152 facilitates drawing the re-cut grass clippings exiting through the exit opening 67 into the housing 156. The location and dimensions of the vent 162 can be configured to provide sufficient air supply to the blower fan 152 to aid in drawing the re-cut grass clippings into the housing 156. As can best be seen in FIG. 7, the housing 156 can have a slightly elongated, offset cross-sectional shape to facilitate moving the re-cut clippings through the housing 156 and onto the dispersion fan 154 below. The protrusions 166 on the spreader fan blades 164 facilitate dispersing the re-cut clippings in a fine, broad spray, for both wet and dry clippings. The outlet 82 of the dispersion chute 76 can be positioned to blow exhaust air from the separator 14 onto the spreader fan blades 164 to aid in spreading the re-cut clippings outward and/or downward to facilitate a broad dispersion of the re-cut grass clippings. Alternatively, or additionally, the dispersion chute 76 may be supplied with a forced air from a separator blower.

Optionally, the outlet 82 of the dispersion chute 76 can be angled so as to force the re-cut grass clippings downward toward the yard. In this configuration, rather than coming to rest on the top of the yard grass, at least a portion of the re-cut grass clippings can be driven further downward toward the ground, in-between the grass blades. An additional or alternative source of forced air can also be used to facilitate forcing the re-cut grass blades further downward toward the ground.

In the illustrated embodiment, the forced air flow path is generally as follows: (1) forced air is created by the mower blades and/or blower 101 and blown with the grass clippings 11 out of the mower deck (represented by arrow A), (2) the air and clippings 11 are blown through the chute 12 to the separation chamber 14, (3) the air flows with the grass clippings into the separation chamber 14 and into a vortex flow pattern around the sidewall of the chamber (represented by arrow C), (4) after reaching the bottom of the chamber 14, the forced air separates from the grass clippings 11 and flows upwardly through the center of the vortex (along a line represented by arrow B), (5) the air is then routed through chute 76 (represented by arrow D) and passes through the outlet 82 wherein the forced air is combined with the re-cut grass clippings drawn through the spreader assembly 150 and being deposited onto the blades 164 of the dispersion fan 154. The combination of the forced air and dispersion fan 154 can facilitate spreading both wet and dry re-cut grass clippings more uniformly and/or increasing the area over which the re-cut grass clippings are dispersed Referring again to FIG. 10, the feeder element 180 can be operated during use of the mulching apparatus 10 to break up material that accumulates around the auger 42 and/or to facilitate feeding the grass clippings to the auger 42. As the auger 42 rotates, grass clippings and other debris can accumulate and form a "bridge" between the auger 42 and other components, such as the sidewall 26 of the container 24, which inhibits grass from being fed by the auger 42 into the compression chamber 44. This build-up can decrease the efficiency of the cutting assembly 16 and eventually interrupt the supply of grass clippings to the compression chamber 44. The feeder element 180 can agitate the material around the auger 42 to inhibit material from bridging over or stagnating around the auger 42. The feeder element 180 may also increase the efficiency of the cutting assembly 16 by increasing and/or stabilizing the supply rate of grass clippings to the compression chamber 44 by the auger 42.

The plurality of teeth 110 provided on the alternative auger 42' of FIG. 6 can also facilitate breaking up material that may accumulate around the auger 42 to inhibit material from bridging over or stagnating around the auger 42. The spacing and dimensions of the teeth 110 can be selected to provide the desired degree of agitation. Alternatively, or additionally, the spacing and dimensions of the teeth 110 are based on the dimensions of the mulching apparatus components, such as the auger 42' and the auger blades 47', and/or the spacing between components such as the auger 42', the auger blades 47', and the sidewalls 26 of the container 24. The alternative auger 42' can be used in combination with the feeder element 180 or used in a configuration that does not include the feeder element 180. For example, the alternative auger 42' can be used in a similar manner with the mulching apparatus of U.S. Patent Pub. No. 2015/0143790 entitled "Mulching Apparatus for a Lawnmower," filed Nov. 22, 2013.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A mulching apparatus for attachment to a lawnmower having a mower deck and at least one lawnmower blade within the mower deck, the mulching apparatus comprising:
   a chute adapted to be attached to the lawnmower for receiving grass clippings from the lawnmower;
   a cutting assembly connected to the chute, the cutting assembly receiving grass clippings from said chute, the cutting assembly including at least one cutting blade configured to cut the grass clippings received from the lawnmower to form mulched grass clippings, the mulched grass clippings exiting the cutting assembly through an outlet; and
   a spreader assembly having an inlet for receiving the mulched grass clippings from the cutting assembly outlet and configured to disperse the mulched grass clippings onto a ground surface, wherein the spreader assembly further includes a dispersion fan having a plurality of rotatable blades configured to disperse the mulched grass clippings onto the ground surface.

2. The mulching apparatus of claim 1 wherein the spreader assembly further includes a blower fan configured to draw the mulched grass clippings exiting the cutting assembly outlet through the spreader assembly.

3. The mulching apparatus of claim 2 wherein the blower fan is powered by one of a motor and a supply of forced air.

4. The mulching apparatus of claim 1 wherein at least a portion of the rotatable blades include at least one projection along a length of the rotatable blade.

5. The mulching apparatus of claim 1 wherein the dispersion fan is powered by one of a motor and a supply of forced air.

6. The mulching apparatus of claim 1 further comprising a source of forced air and a chute for supplying the forced air onto the dispersion fan.

7. A mulching apparatus for attachment to a lawnmower having a mower deck and at least one lawnmower blade within the mower deck, the mulching apparatus comprising:
   a chute adapted to be attached to the lawnmower for receiving grass clippings from the lawnmower;
   a cutting assembly connected to the chute, the cutting assembly receiving grass clippings from said chute, the cutting assembly including at least one cutting blade configured to cut the grass clippings received from the lawnmower to form mulched grass clippings, the mulched grass clippings exiting the cutting assembly through an outlet; and
   a spreader assembly having an inlet for receiving the mulched grass clippings from the cutting assembly outlet and configured to disperse the mulched grass clippings onto a ground surface, wherein the cutting assembly further comprises an auger rotatable about a central axis and configured to drive the grass clippings toward the cutting blade.

8. The mulching apparatus of claim 7 wherein the auger includes an auger blade and a plurality of teeth projecting from the auger blade.

* * * * *